(12) United States Patent
Gopalarathnam

(10) Patent No.: US 11,144,384 B1
(45) Date of Patent: Oct. 12, 2021

(54) PROACTIVELY ADDRESSING FAN OR FAN TRAY FAILURES

(71) Applicant: DELL PRODUCTS L.P., Round Rock, TX (US)

(72) Inventor: Sudharsan Dhamal Gopalarathnam, Redmond, WA (US)

(73) Assignee: DELL PRODUCTS L.P.

( * ) Notice: Subject to any disclaimer, the term of this patent is extended or adjusted under 35 U.S.C. 154(b) by 0 days.

(21) Appl. No.: 16/900,964

(22) Filed: Jun. 14, 2020

(51) Int. Cl.
| | |
|---|---|
| *G06F 11/00* | (2006.01) |
| *G06F 11/07* | (2006.01) |
| *G06F 11/30* | (2006.01) |
| *G01K 3/00* | (2006.01) |
| *G01K 13/00* | (2021.01) |

(52) U.S. Cl.
CPC ............ *G06F 11/0793* (2013.01); *G01K 3/00* (2013.01); *G01K 13/00* (2013.01); *G06F 11/0709* (2013.01); *G06F 11/0751* (2013.01); *G06F 11/0772* (2013.01); *G06F 11/3013* (2013.01); *G06F 11/3058* (2013.01); *G06F 11/3065* (2013.01)

(58) Field of Classification Search
CPC ............ G06F 11/0796; G06F 11/3058; G06F 11/3013; G06F 11/0772; G06F 11/3065
See application file for complete search history.

(56) References Cited

U.S. PATENT DOCUMENTS

| | | | |
|---|---|---|---|
| 2005/0078660 A1* | 4/2005 | Wood .................... | H04M 15/43 370/352 |
| 2006/0168473 A1* | 7/2006 | Sahoo ................. | G06F 11/1471 714/15 |
| 2008/0163226 A1* | 7/2008 | Radhakrisnan ......... | G06F 1/206 718/102 |

* cited by examiner

*Primary Examiner* — Charles Ehne
(74) *Attorney, Agent, or Firm* — North Weber & Baugh LLP

(57) ABSTRACT

Fan or fan tray failures are currently handled within the scope of the information handling system that has suffered the failure. In such cases, the addressing such issues may be difficult or impossible to do without completely shutting down the device. In one or more embodiments, by announcing the failure to one or more protocols, which allows the handling of such a failure event at a topological level rather that purely at the device level, the impact to the device as well as to the overall traffic in the topology may be drastically mitigated.

20 Claims, 9 Drawing Sheets

PROACTIVELY ADDRESSING FAN OR FAN TRAY FAILURES

BACKGROUND

The present disclosure relates generally to information handling system. More particularly, the present disclosure relates to information handling system in a networked environment.

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable and always function. To help keep information handling system operating in the field (i.e., when already deployed and in use), many information handling systems, such as network switches and routers, are designed in modular form. This modular design makes replacing components or subsystem quick and relatively easy in spite of the ever-increasing complexity of such devices. An installed information handling system does not need to be completely removed and replaced; rather, the defective part can be replaced. To facilitate such repairs, many information handling systems have field replaceable units to allow for repairs in the field.

One such modular subsystem of information handling systems is the cooling system. The cooling system typically comprises a number of fans or fan trays. A fan tray is typically two or more fans within a single housing unit. Because cooling is important to the performance and longevity of an information handling system, the fans typically run constantly or nearly constantly. As a result, it is not uncommon for a fan or fan tray to fail.

While the modular nature of an information handling system allows for the relatively easy repair of the defective fan/fan tray, cooling the information handling system until the repair can be effected is an issue. When a fan or fan tray fails, a network administrator is placed in a difficult dilemma. One side of the dilemma is the pressure to keep the information handling system in service even with a defective fan/fan tray. Because of the high demands to keep the network operating and operating a peak performance, there is pressure to keep the information handling system operating with the hope that the remaining fans/fan trays can keep the information handling system sufficiently cooled.

However, on the other side of the dilemma are the concerns if the information handling system overheats. These devices are extremely complex and expensive. If components fail due to overheating, it could result in having to replace several costly components—or even result in having to replace the entire information handling system—all for a relatively inexpensive fan. Also, if additional repairs or complete replacement are required, in addition to the added repair/replacement costs, there will be significantly more downtime. Given the high costs if the device continues to run, the typical mitigation strategy is to shut down the information handling system until the repair can be made.

Accordingly, what is need are approaches that allow for the continued operation of an information handling system with a defective fan/fan tray but in such a way as to safeguard the information handling system from excessive heating.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
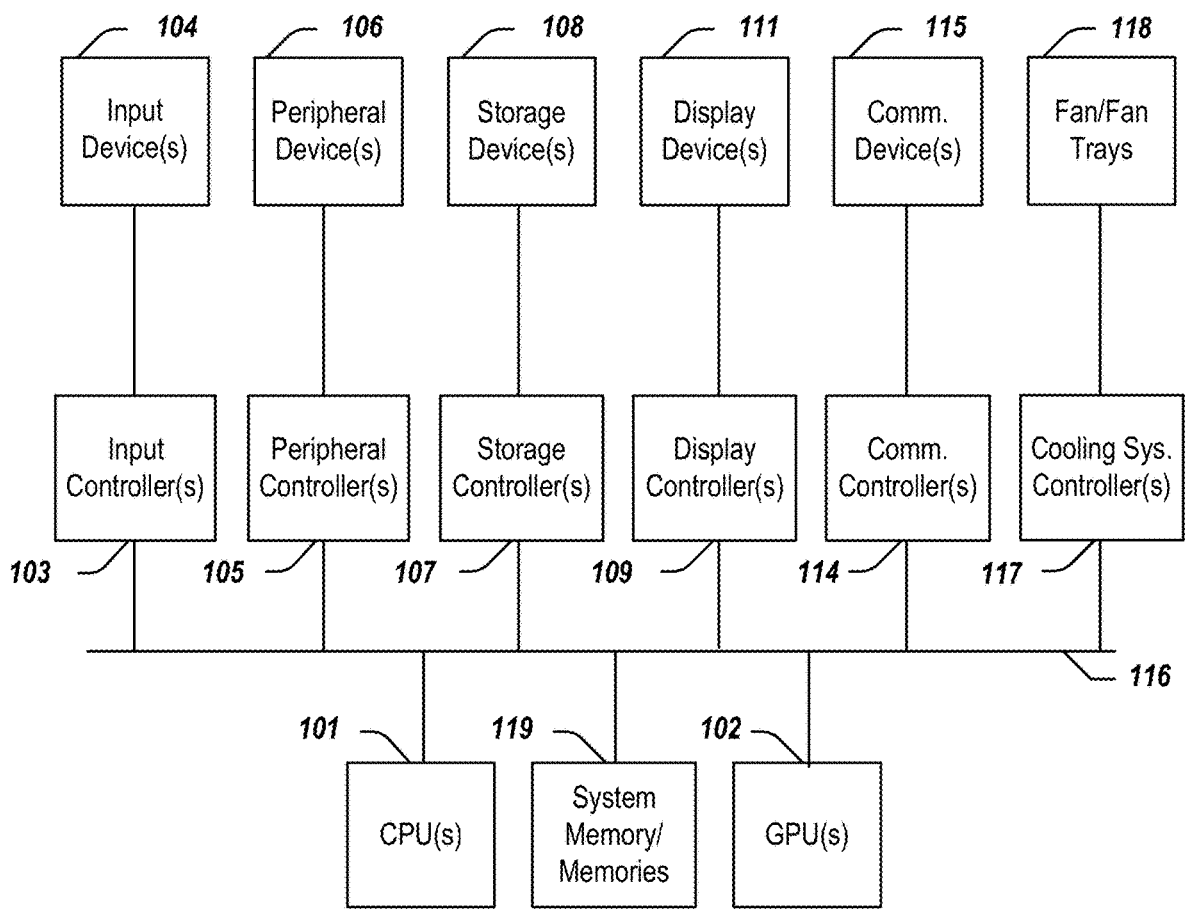
FIG. 1 depicts a simplified block diagram of an information handling system, according to embodiments of the present invention.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of networking switches and routers, aspects of the present disclosure are not so limited. Accordingly, the aspects of the present disclosure may be applied or adapted for use in other contexts.

A. Introduction

As noted previously, many information handling systems, such as network switches and routers, are designed in modular form. This modular design makes replacing components or subsystem easier. Thus, many such information handling system supporting the use of field replaceable units to allow for repairs in the field.

One such information handling system component is the fan subsystem. Information handling systems typically have one or more fans, whether as individual fans or as a modular subsystem of two or more fans, which may be referred to as a fan tray. The fans/fan trays are an important part of the cooling system of an information handling system. As information handling system process more and more data at faster and faster speeds, heat generation becomes more of an issue. Since excess heat cannot only degrade performance of an information handling system, it can also result in permanent damage to important and expensive components of the information handling system. Thus, it is common for many networking switch or router to have multiple fans and/or multiple fan trays.

The nearly constant runtime of these physical devices can result in failure of one or more fans/fan trays. When a fan or fan tray fails, a network administration can order a replacement and manually replace the failed one with a replacement. While an information handling system may have multiple fans or multiple fan trays—so that the loss of one fan or fan tray does not require the information handling system to be taken out of service, it often requires some modification to the fan cycles of the remaining fans. For example, until the broken fan/fan tray is repaired, the speeds of the remaining fans may be adjusted to compensation for the loss of a fan/fan tray. However, sometimes even with such modifications, the remaining fans may not be able to sufficiently cool the information handling system. As a result, the temperature of the information handling system may increase—leading to events like thermal shutdown or deterioration of components due to overheating.

It is also possible that more than one fan or fan tray fails in an information handling system. Such cases lead to conditions susceptible to sudden hike in temperatures. In cases of multiple fan/fan tray failures, it is less likely that the remaining fans/fan trays will be able to compensate. However, networking switches and routers, such as those in the core of a network or data center, tend to have critical roles. To take such devices out of service can significantly impact the network. Thus, it is extremely desirable to avoid a full shutdown of the device. Accordingly, embodiments herein allow for the continued operation of an information handling system with one or more defective fans/fan trays but in such a way as to safeguard the information handling system from excessive heating.

B. System Embodiments for Addressing Fan/Fan Tray Failures

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen, and/or video display. The computing system may also include one or more buses operable to transmit communications between the various hardware components.

FIG. 1 depicts a simplified block diagram of an information handling system (or computing system), according to embodiments of the present disclosure. It will be understood that the functionalities shown for system 100 may operate to support various embodiments of a computing system—although it shall be understood that a computing system may be differently configured and include different components, including having fewer or more components as depicted in FIG. 1.

As illustrated in FIG. 1, the computing system 100 includes one or more central processing units (CPU) 101 that provides computing resources and controls the computer. CPU 101 may be implemented with a microprocessor or the like, and may also include one or more graphics processing units (GPU) 102 and/or a floating-point coprocessor for mathematical computations. In one or more embodiments, one or more GPUs 102 may be incorporated within the display controller 109, such as part of a graphics card or cards. The system 100 may also include a system memory 119, which may comprise RAM, ROM, or both.

A number of controllers and peripheral devices may also be provided, as shown in FIG. 1. An input controller 103 represents an interface to various input device(s) 104, such as a keyboard, mouse, touchscreen, and/or stylus. The computing system 100 may also include a storage controller 107 for interfacing with one or more storage devices 108 each of which includes a storage medium such as magnetic tape or disk, or an optical medium that might be used to record programs of instructions for operating systems, utilities, and applications, which may include embodiments of programs that implement various aspects of the present disclosure. Storage device(s) 108 may also be used to store processed data or data to be processed in accordance with the disclosure. The system 100 may also include a display controller 109 for providing an interface to a display device 111, which may be a cathode ray tube (CRT) display, a thin film transistor (TFT) display, organic light-emitting diode, electroluminescent panel, plasma panel, or any other type of display. The computing system 100 may also include one or more peripheral controllers or interfaces 105 for one or more peripherals 106. Examples of peripherals may include one or more printers, scanners, input devices, output devices, sensors, and the like. A communications controller 114 may interface with one or more communication devices 115, which enables the system 100 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

As shown in the depicted embodiment, the computing system 100 comprises one or more fans or fan trays 118 and a cooling subsystem controller or controllers 117 that monitors thermal temperature(s) of the system 100 (or components thereof) and operates the fans/fan trays 118 to help regulate the temperature. In one or more embodiments, the system comprises a chassis manager that monitors one or more temperature sensors and activates the fans accordingly. Embodiments for controlling the fans/fan trays are discussed in more detail below.

In the illustrated system, all major system components may connect to a bus 116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 2:
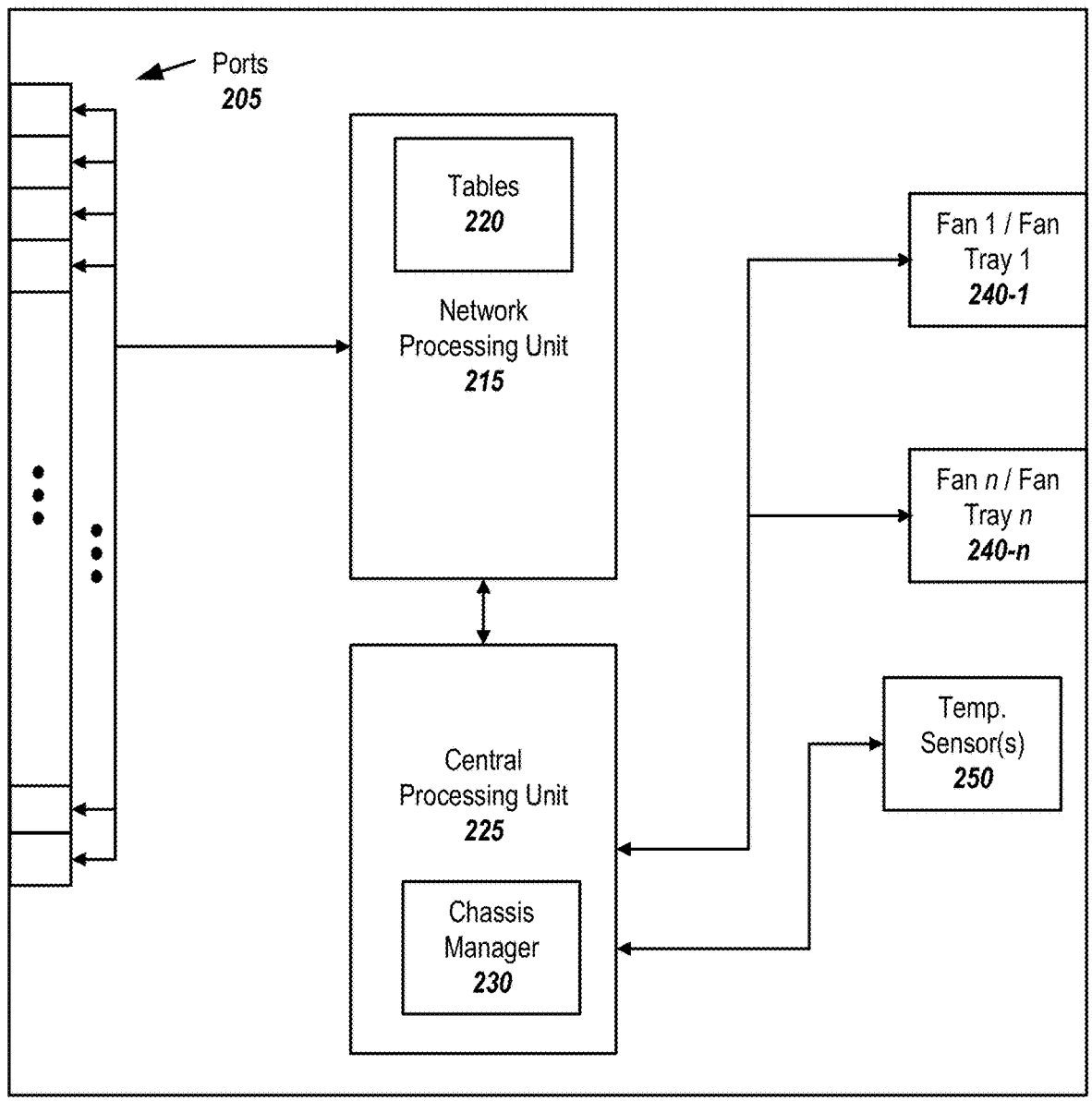
FIG. 2 depicts an alternative block diagram of an information handling system, according to embodiments of the present disclosure.

FIG. 2 depicts an alternative block diagram of an information handling system, according to embodiments of the present disclosure. It will be understood that the functionalities shown for system 200 may operate to support various embodiments of the present disclosure—although it shall be understood that such system may be differently configured and include different components, additional components, or fewer components.

The information handling system 200 may include a plurality of I/O ports 205, a network processing unit (NPU) 215, one or more tables 220, and a central processing unit (CPU) 225. The system includes a power supply (not shown) and may also include other components, which are not shown for sake of simplicity.

In one or more embodiments, the I/O ports 205 may be connected via one or more cables to one or more other network devices or clients. The network processing unit 215 may use information included in the network data received at the node 200, as well as information stored in the tables 220, to identify a next device for the network data, among other possible activities. In one or more embodiments, a switching fabric may then schedule the network data for propagation through the node to an egress port for transmission to the next destination.

Also depicted in FIG. 2 are a set of fans or fan trays 240 and one or more temperature sensors for monitoring temperature at one or more locations in the system 200. In one or more embodiments, the temperature information is provided to a chassis manager 230 that controls operation of the fans 240.

In one or more embodiments, whenever a fan/fan tray 240 failure condition is detected by the local device's chassis manager 230, the chassis manger 230 invokes one or more actions depending on the extent of the failure and the monitor temperatures. The following section presents embodiments of actions that may be implemented according to embodiments of the present disclosure.

C. Method Embodiments for Addressing Fan/Fan Tray Failures

As noted above, whenever a fan/fan tray failure is detected, a chassis manger may invoke one or more actions, depending on circumstances. For sake of convenience, the term "fan" or "fan element" shall be construed to cover fan or fan tray. To help illustrate various embodiments that may be employed, consider the example network depicted in FIG. 3.

Figure 3:
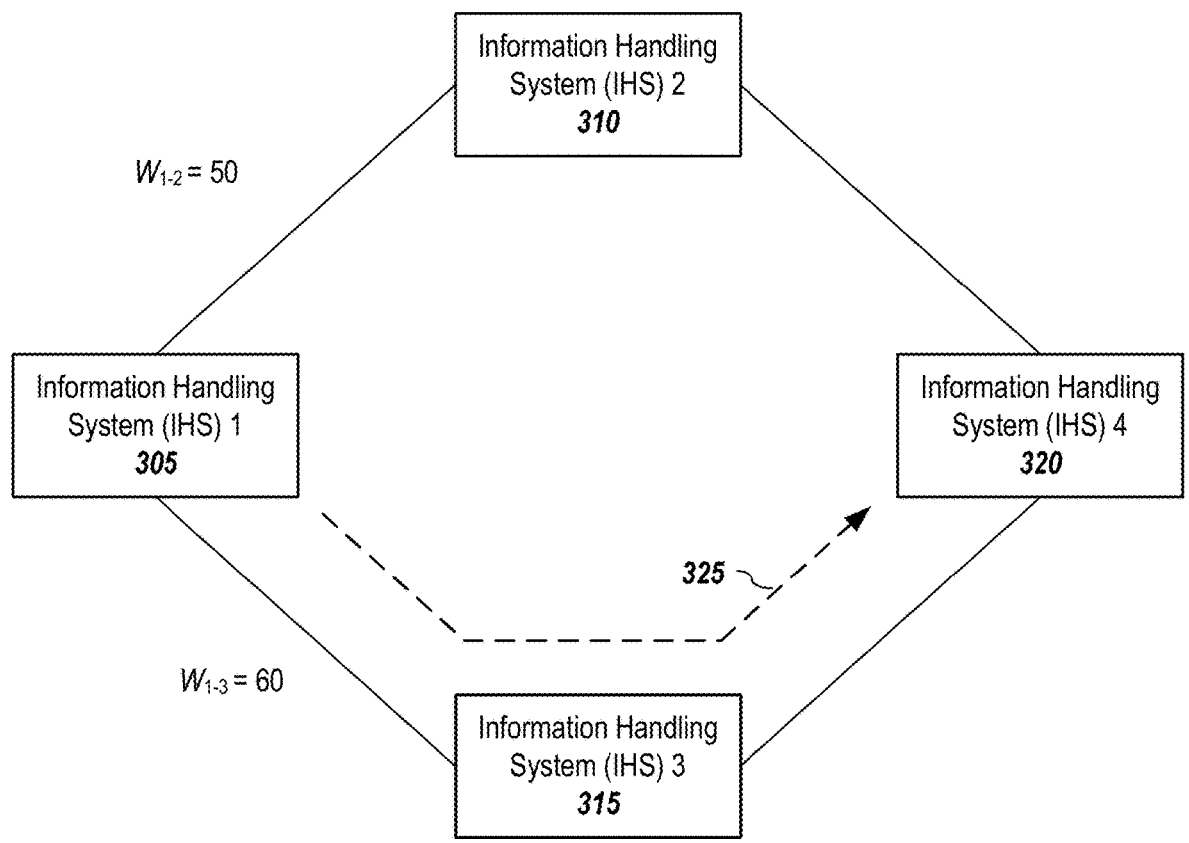
FIG. 3 depicts an example network system, according to embodiment of the present disclosure.

FIG. 3 depicts a network system 300, according to embodiment of the present disclosure. As depicted, the networking system comprises four information handling systems 305-320, which may be switches and/or routers. As illustrated, all the information handling system 305-320 are functioning properly. Also assume that one or more of the protocols operating on information handling system 305 have assigned weights to the pathways: $W_{1-2}$ has been assigned a weight of 50, and $W_{1-3}$ has been assigned a weight of 60, where a higher weight indicates a higher preference for data flow. One skilled in the art shall recognized that weights may be assigned in a number of ways, including via protocol(s), such as Open Shortest Path First (OSPF), Routing Information Protocol (RIP), Border Gateway Protocol (BGP), among others.

For example, data arriving at information handling system 305 that is intended for information handling system 320 may be routed via either information handling system 310 or information handling system 315; however, given the weighting, it is more likely to be routed 325 via information handling system 315.

Figure 4:
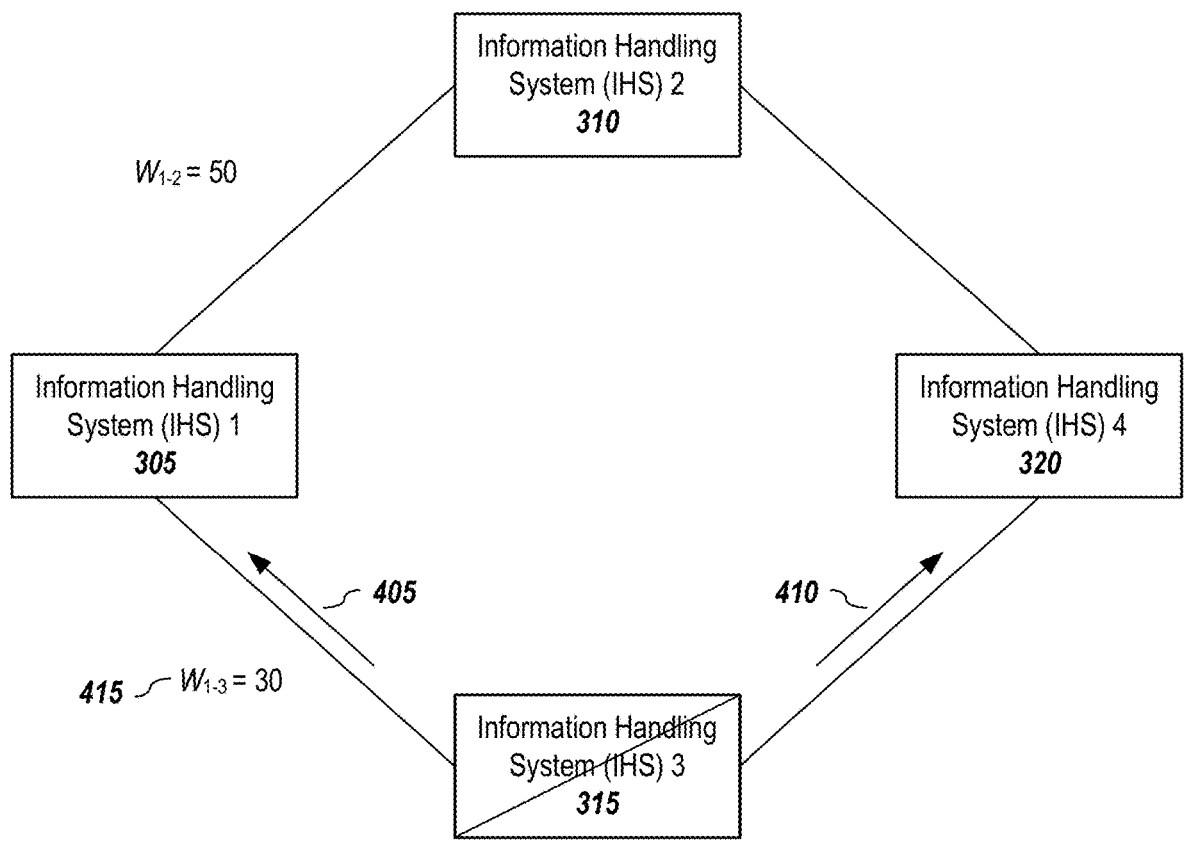
FIG. 4 depicts the network system of FIG. 3 in which a fan/fan tray failure has occurred on one device, according to embodiment of the present disclosure.
Figure 5:
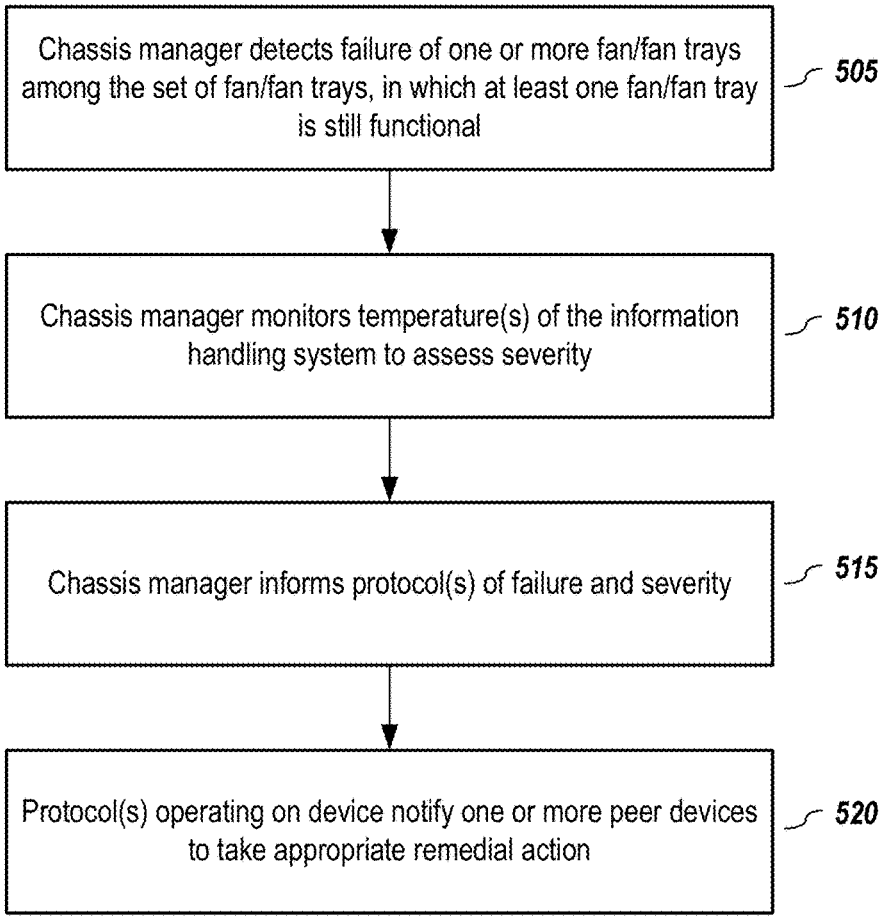
FIG. 5 depicts a methodology that may be employed to affect traffic when an information handling system has had a fan failure, according to embodiments of the present disclosure.

Turning now to FIG. 4, depicted is the network system of FIG. 3, however one of the information handling system, switch/router 315, has experienced a fan failure. Assume that one or more fans have failed in information handling system 315, which is illustrated in FIG. 4 with a slash through it to distinguish it as being the system with a fan failure. FIG. 5 depicts a methodology that may be employed to affect traffic when an information handling system has had a fan failure, according to embodiments of the present disclosure.

In one or more embodiments, the chassis manager of the information handling system 315 detects (505) failure of one or more fan/fan trays among the set of fan/fan trays in the system 315, in which at least one fan/fan tray is still functional. If all the fans have failed, the safest course of action is for the chassis manager to have the information handling system shut down as soon as possible.

Given that at least one fan/fan tray is functional so that the information handling system 315 can continue to operate, the chassis manager monitors (510) one or more temperature(s) of the information handling system to assess severity of the situation. In one or more embodiments, the severity may be determined by the temperature (e.g., the highest temperature if more than one temperature is measured, an average temperature, a temperature of a critical component or subsystem, etc.). In one or more embodiments, the chassis manager informs (515) one or more protocol services operating on the information handling system 315 of failure and severity. In one or more embodiments, the protocol or protocols interface with an NPU on the device to notify other devices and to make other networking-related change. Such protocol services may include, by way of example, Open Shortest Path First (OSPF), Routing Information Protocol (RIP), and Border Gateway Protocol (BGP). In one or more embodiments, the protocol service or services proactively act (520) to affect the traffic flowing through the affected information handling system by notifying one or more other devices communicatively coupled to the affected device 315.

Referring to FIG. 4, in one or more embodiments, the information handling system 315 may send notifications (e.g., notification 405 and 410) to the neighboring devices/ peer devices (e.g., the information handling systems 305 and 320). By notifying these information handling system, they may then take remedial actions. For example, the information handling system 305 may adjust the weighting 415 (e.g., $W_{1-3}$ is reduced to 30 from 60) to reduce traffic flows to the affected information handling system 315. Thus, after notification, the routing protocol will not preference the path to the information handling system 320 to be via the information handling system 315 and thus modify the path from IHS1 (305)-IHS3 (315)-IHS4 (320) to the path IHS1 (305)-IHS2 (310)-IHS4 (320).

Figure 6:
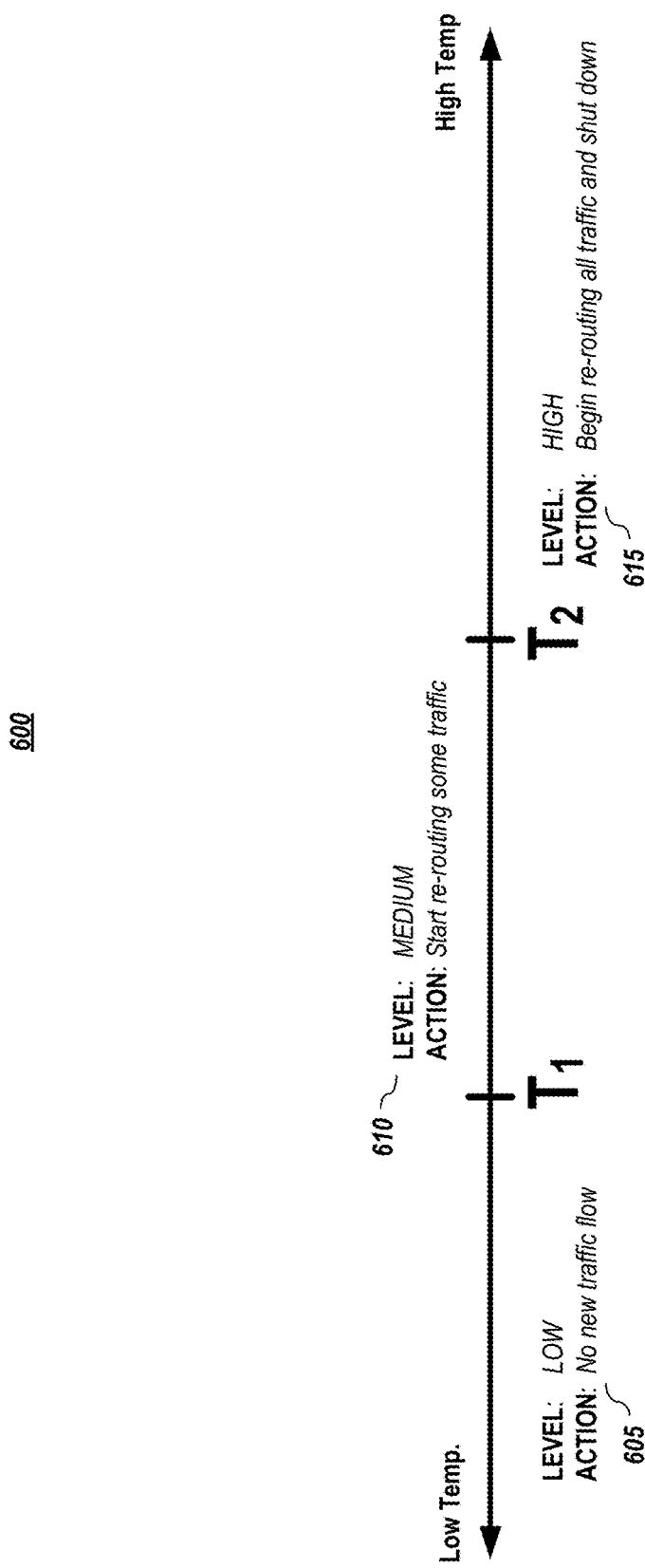
FIG. 6 depicts an example temperature spectrum with severities and corresponding actions, according to embodiments of the present disclosure.

FIG. 6 depicts an example temperature spectrum with severities and corresponding actions, according to embodiments of the present disclosure. As depicted, there are three level that may correspond to three levels of notification and remedial action:

Low (605)—With the current existing fan failure, the information handling system may operate its existing fans at a higher speed thereby mitigating the problem. In one or more embodiment, the peer devices are instructed that the affected device can maintain its existing traffic flows but that the peer devices should not send any new traffic flows through this device.

Medium (610)—With the fan failure, the device may operate; however, the information handling system is facing increasing temperature, which might not be controlled unless existing traffic is reduced. Accordingly, in one or more embodiments, the peer devices, upon receiving this notification, should start diverting existing traffic flows to alternate paths until receipt of another notification. For example, if the traffic diversion has been successful, the notification may be sent that a sustainable level has been reach, in which case the affected information handling system may send a "low" level notification. Or, alternatively, it may be that even with diverted traffic flows the device is still heating and may need to shut down. In such a case, the affected device may send a "high" level notification.

High (615)—With the fan failure, the device temperature may increase and reaching a threshold for shutdown. Accordingly, upon receiving a "high" level notification, the peer devices are notified that they should completely reroute the entire traffic away from the affected device so that it can shut down.

It shall be noted fewer or more levels and corresponding actions may be used. It shall also be noted that the same or similar severity levels may be applied using to fan failure as a metric. For example, a single fan failure may be a low level, two or three fan failures may be a medium level, and above three fan failures is deemed a high level. In one or more embodiments, the levels may also be based upon a combination of multiple factors, such as temperature and fan failure metrics.

Figure 7:
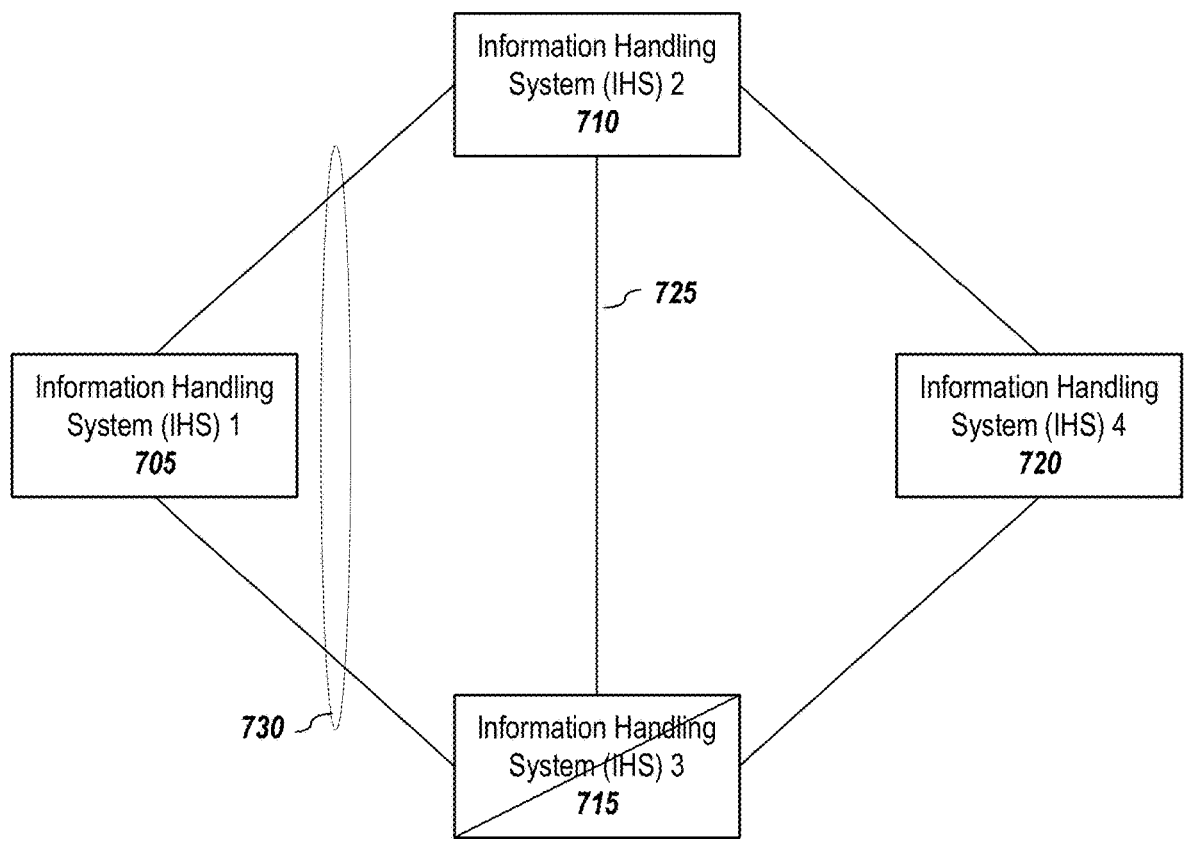
FIG. 7 depicts an alternative example network configuration, according to embodiments of the present disclosure.

FIG. 7 depicts an alternative network configuration, according to embodiments of the present disclosure. The network 700 depicted in FIG. 7 is similar to that depicted in FIG. 3; however, in FIG. 7, the information handling systems 710 and 715 are peer nodes of a link aggregation group (LAG) 730 that is formed from the links from the information handling system 705. Note also that the information handling system 710 is connected to information handling system 715 via an inter-chassis link (ICL).

In one or more embodiments, a switching protocols, such as Spanning Tree Protocol (STP), may change a blocking/forwarding states based on such a failure event. Additionally, or alternatively, one or more LAG-related protocols may adjust the traffic hashing so that less preference is given to the node with a failed fan/fan tray.

Figure 8:
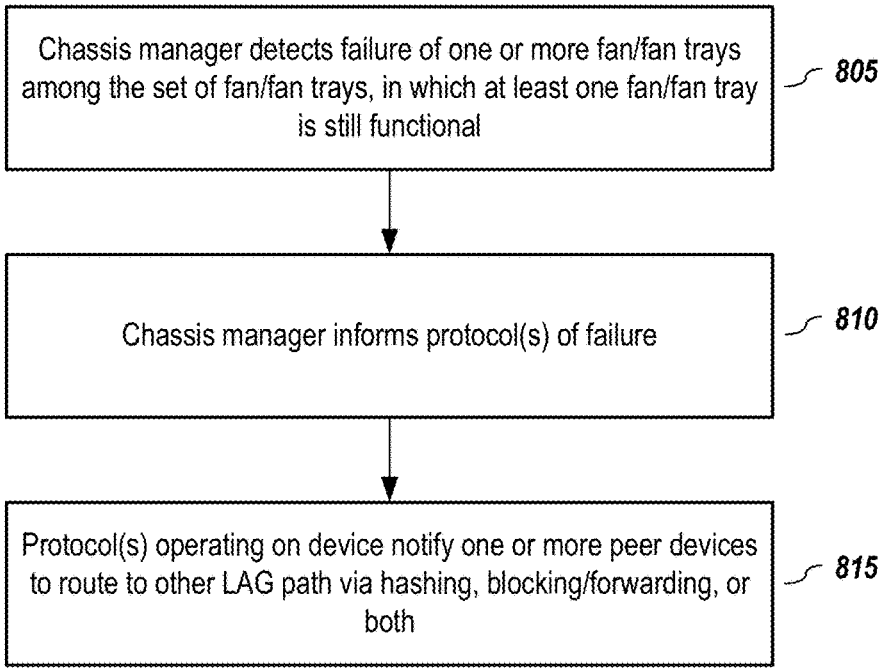
FIG. 8 depicts a methodology that may be employed to affect traffic when an information handling system has had a fan failure, according to embodiments of the present disclosure.

FIG. 8 depicts a methodology that may be employed to affect traffic when an information handling system has had a fan failure, according to embodiments of the present disclosure. In one or more embodiments, the chassis manager of the information handling system 715 detects (805) failure of one or more fan/fan trays among the set of fan/fan trays in the system 715, in which at least one fan/fan tray is still functional. If all the fans have failed, the chassis manager may shutdown the information handling system.

Given that at least one fan/fan tray is functional so that the information handling system 715 can continue to operate, the chassis manager informs (810) one or more protocol services operating on the information handling system 715 of failure and severity. In one or more embodiments, the protocol service(s) act to affect the traffic flowing through the affected information handling system by notifying one or more other devices communicatively coupled to the affected device 315. For example, the affected information handling system 715 may notify its peer LAG node 710 via the ICL to take one or more actions to reduce traffic it. For example, the information handling system 710 may block traffic via the ICL to the affected information handling system 715. Additionally or alternatively, the information handling system 705 may block traffic exiting a LAG port that is connected to the affected information handling system 715 or change its hash so no traffic (or less traffic) gets placed on the pathway to information handling system 715 but is instead directed to the other peer LAG node, information handling system 710.

Additionally, in one or more embodiments, the chassis manager may include logic that monitors the affected information handling system and informs the routing/switching protocols of how much traffic the information handling system can handle based on current temperature range and the protocols can accordingly modify the routing parameters to match that amount of traffic to be managed by device.

Figure 9:
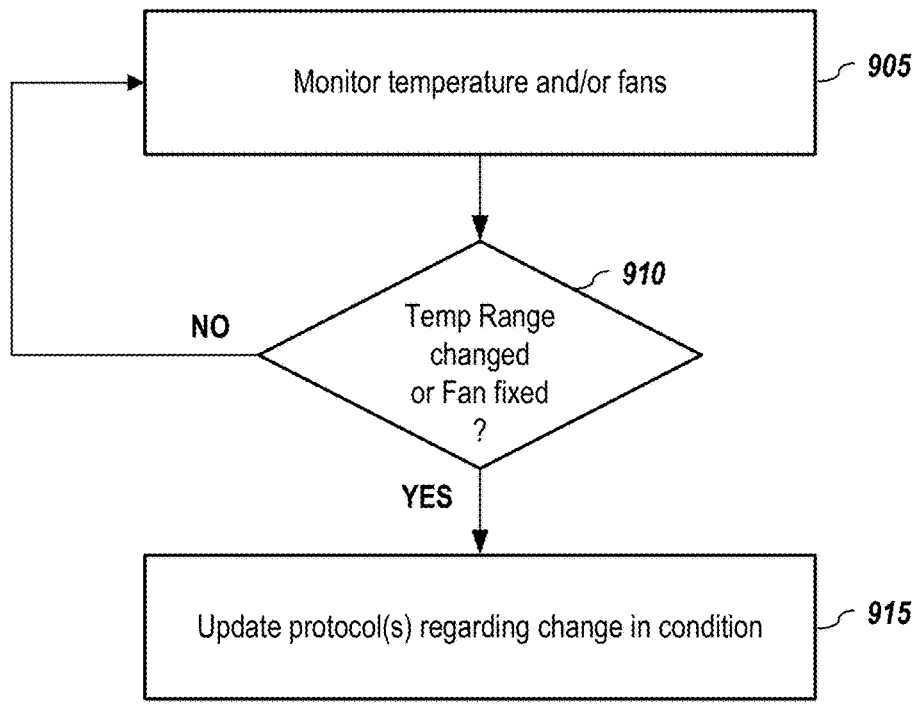
FIG. 9 depicts a methodology that may be employed to monitor an affected information handling system that has had a fan failure, according to embodiments of the present disclosure.

FIG. 9 depicts an example methodology, according to embodiments of the present disclosure.

FIG. 9 depicts a methodology that may be employed to monitor an affected information handling system that has had a fan failure, according to embodiments of the present disclosure. In one or more embodiments, the chassis manager monitors (905) one or more temperatures of the information handling system, the fans/fan trays, or both. The monitoring may be performed on a periodic basis, according to schedule, as a result of triggers, or any combination thereof. In one or more embodiments, if a condition changes (910), the chassis manager updates (915) one or more protocols of the change of condition so that they may take appropriate action. For example, if the chassis was running at a "low" level severity, but the temperature spikes to a dangerous level, the chassis manager may notify one or more protocols to alter other devices that the status is now "high" and appropriate action should be taken to reduce traffic to the affected information handling system. Also, by way of example, once a network administrator has replaced the broken fan, the chassis manager may then inform the protocol(s), causing the information handling system and the peer devices to revert to normal configured metrics—thereby making the information handling system handling traffic as before the failure event.

In one or more embodiments, if no conditions change (910), the chassis manager may continue to monitor for changes of temperature and/or fan status.

D. Additional Embodiments

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for handling a fan or fan tray failure in an information handling system (IHS), the method comprising:
   monitoring status of one or more fans or fan trays of the information handling system; and
   responsive to receiving a notification of a failure of a fan or fan tray failure of the information handling system:
      notifying one or more protocols of the information handling system of the failure to trigger alerting, via the one or more protocols, one or more information handling system communicatively coupled to the information handling system that has the failure to take one or more actions to adjust traffic to the information handling system with the failure; and
      sending one or more notifications to the one or more information handling system communicatively coupled to the information handling system with the failure to take one or more actions to adjust traffic to the information handling system with the failure.

2. The method of claim 1 wherein at least one of the one or more actions comprises having traffic blocked to the information handling system with the failure.

3. The method of claim 1 wherein at least one of the one or more actions comprises adjusting a hashing or a weighting to have less traffic directed to the information handling system with the failure.

4. The method of claim 1 further comprising:
   monitoring one or more temperatures of the information handling system with the failure;
   assigning a severity level based upon at least one of the one or more temperatures; and
   including an indicator of the severity level in at least one of the one or more notifications to at least one of the one or more information handling system communicatively coupled to the information handling system with the failure, in which the indicator of the severity level affects which action is taken by at least one of the one or more information handling system communicatively coupled to the information handling system with the failure.

5. The method of claim 4 wherein the severity further comprising:
   a low severity level, which indicates to a notification-receiving information handling system from the one or more information handling system communicatively coupled to the information handling system with the failure that the information handling system with the failure may maintain its existing traffic flows but that the notification-receiving information handling system should not send any new traffic flows to the information handling system with the failure;
   a medium severity level, which indicates to a notification-receiving information handling system from the one or more information handling system communicatively coupled to the information handling system with the failure that the notification-receiving information handling system should divert at least some existing traffic flows that are currently going to the information handling system with the failure to one or more alternate paths that do not utilize the information handling system with the failure; and
   a high severity level, which indicates to a notification-receiving information handling system from the one or more information handling system communicatively coupled to the information handling system with the failure that the notification-receiving information handling system should reroute all traffic to paths that do not utilize the information handling system with the failure.

6. The method of claim 1 further comprising:
   monitoring one or more temperatures of the information handling system with the failure, monitoring one or more fans or fan trays of the information handling system with the failure, or both; and
   responsive to a change in condition at the information handling system, sending one or more update notifications to at least one of the one or more information handling system communicatively coupled to the information handling system.

7. The method of claim 6 wherein the change of condition is that the failure has been remedied and the method further comprises:
   sending one or more notifications to the one or more information handling system communicatively coupled to the information handling system to take one or more actions to resume normal traffic processing.

8. An information handling system comprising:
   one or more processors;
   a plurality of fans elements comprising one or more fans, one or more fan trays, or both; and
   a chassis manager configured to cause steps to be performed comprising:
      monitoring status of one or more fans or fan trays of the information handling system; and
      responsive to receiving a notification of a failure of a fan or fan tray failure of the information handling system:
         notifying one or more protocols of the information handling system of the failure to trigger alerting, via the one or more protocols, one or more information handling system communicatively coupled to the information handling system that has the failure to take one or more actions to adjust traffic to the information handling system with the failure; and sending one or more notifications to the one or more information handling system communicatively coupled to the information handling system with the failure to take one or more actions to adjust traffic to the information handling system with the failure.

9. The system of claim 8 wherein at least one of the one or more actions comprises having traffic blocked to the information handling system with the failure.

10. The system of claim 8 wherein at least one of the one or more actions comprises adjusting a hashing or a weighting to have less traffic directed to the information handling system with the failure.

11. The system of claim 8 further comprising:
one or more temperature sensors; and
wherein the chassis manager is further configured to cause steps to be performed comprising:
monitoring one or more temperatures of the information handling system with the failure;
assigning a severity level based upon at least one of the one or more temperatures; and
including an indicator of the severity level in at least one of the one or more notifications to at least one of the one or more information handling system communicatively coupled to the information handling system with the failure, in which the indicator of the severity level affects which action is taken by at least one of the one or more information handling system communicatively coupled to the information handling system with the failure.

12. The system of claim 11 wherein the severity further comprising:
a low severity level, which indicates to a notification-receiving information handling system from the one or more information handling system communicatively coupled to the information handling system with the failure that the information handling system with the failure may maintain its existing traffic flows but that the notification-receiving information handling system should not send any new traffic flows to the information handling system with the failure;
a medium severity level, which indicates to a notification-receiving information handling system from the one or more information handling system communicatively coupled to the information handling system with the failure that the notification-receiving information handling system should divert at least some existing traffic flows that are currently going to the information handling system with the failure to one or more alternate paths that do not utilize the information handling system with the failure; and
a high severity level, which indicates to a notification-receiving information handling system from the one or more information handling system communicatively coupled to the information handling system with the failure that the notification-receiving information handling system should reroute all traffic to paths that do not utilize the information handling system with the failure.

13. The system of claim 8 wherein the chassis manager is further configured to cause steps to be performed comprising:

monitoring one or more temperatures of the information handling system with the failure, monitoring one or more fans or fan trays of the information handling system with the failure, or both; and
responsive to a change in condition at the information handling system, sending one or more update notifications to at least one of the one or more information handling system communicatively coupled to the information handling system.

14. The system of claim 13 wherein the change of condition is that the failure has been remedied and the chassis manager is further configured to cause steps to be performed comprising:
sending one or more notifications to the one or more information handling system communicatively coupled to the information handling system to take one or more actions to resume normal traffic processing.

15. An information handling system comprising:
one or more processors;
a plurality of fans elements comprising one or more fans, one or more fan trays, or both;
one or more temperature sensors; and
a chassis manager configured to cause steps to be performed comprising:
monitoring status of one or more fans or fan trays of the information handling system;
monitoring temperature using at least one of the one or more temperature sensors; and
responsive to receiving a notification of a failure of a fan or fan tray failure of the information handling system:
notifying one or more protocols of the information handling system of the failure to trigger alerting, via the one or more protocols, one or more information handling system communicatively coupled to the information handling system that has the failure to take one or more actions to adjust traffic to the information handling system with the failure; and
sending one or more notifications to the one or more information handling system communicatively coupled to the information handling system with the failure to take one or more actions to adjust traffic to the information handling system with the failure.

16. The system of claim 15 wherein at least one of the one or more actions comprises having traffic blocked to the information handling system with the failure.

17. The system of claim 15 wherein at least one of the one or more actions comprises adjusting a hashing or a weighting to have less traffic directed to the information handling system with the failure.

18. The system of claim 15 further wherein the chassis manager is further configured to cause steps to be performed comprising:
assigning a severity level based upon at least one of the one or more temperatures; and
including an indicator of the severity level in at least one of the one or more notifications to at least one of the one or more information handling system communicatively coupled to the information handling system with the failure, in which the indicator of the severity level affects which action is taken by at least one of the one or more information handling system communicatively coupled to the information handling system with the failure.

19. The system of claim 18 wherein the severity further comprising:
- a low severity level, which indicates to a notification-receiving information handling system from the one or more information handling system communicatively coupled to the information handling system with the failure that the information handling system with the failure may maintain its existing traffic flows but that the notification-receiving information handling system should not send any new traffic flows to the information handling system with the failure;
- a medium severity level, which indicates to a notification-receiving information handling system from the one or more information handling system communicatively coupled to the information handling system with the failure that the notification-receiving information handling system should divert at least some existing traffic flows that are currently going to the information handling system with the failure to one or more alternate paths that do not utilize the information handling system with the failure; and
- a high severity level, which indicates to a notification-receiving information handling system from the one or more information handling system communicatively coupled to the information handling system with the failure that the notification-receiving information handling system should reroute all traffic to paths that do not utilize the information handling system with the failure.

20. The system of claim 15 wherein the chassis manager is further configured to cause steps to be performed comprising:
- monitoring one or more temperatures of the information handling system with the failure, monitoring one or more fans or fan trays of the information handling system with the failure, or both; and
- responsive to a change in condition at the information handling system, sending one or more update notifications to at least one of the one or more information handling system communicatively coupled to the information handling system.

* * * * *